United States Patent [19]

Nakahara et al.

[11] Patent Number: 5,094,135
[45] Date of Patent: Mar. 10, 1992

[54] SAW BLADE

[75] Inventors: Katsumi Nakahara, Nishiwaki; Hiroyuki Okada, Hyougo, both of Japan

[73] Assignee: Amada Company, Limited, Japan

[21] Appl. No.: 446,786

[22] Filed: Dec. 6, 1989

[30] Foreign Application Priority Data

Dec. 7, 1988 [JP] Japan .................................. 63-307782
Jan. 12, 1989 [JP] Japan ...................................... 1-3709

[51] Int. Cl.$^5$ ...................... B23D 57/00; B27B 33/02
[52] U.S. Cl. ........................................ 83/847; 83/848; 83/851
[58] Field of Search ................. 83/846, 847, 848, 849, 83/850, 851, 852

[56] References Cited

U.S. PATENT DOCUMENTS

| | | |
|---|---|---|
| 349,143 | 9/1886 | Clemson ................................. 83/849 |
| 1,850,478 | 3/1932 | Schaefer . |
| 2,239,317 | 4/1941 | Gibb . |
| 2,534,424 | 12/1950 | Dryden .................................. 83/846 |
| 2,568,870 | 9/1951 | Ronan .................................... 83/846 |
| 4,195,543 | 4/1980 | Tapply et al. ......................... 83/794 |
| 4,557,172 | 12/1985 | Yaneda .................................. 83/848 |
| 4,727,788 | 3/1988 | Yoshida et al. ....................... 83/848 |
| 4,813,324 | 3/1989 | Yoshida et al. ....................... 83/848 |
| 4,958,546 | 9/1990 | Yoshida et al. ....................... 83/848 |

FOREIGN PATENT DOCUMENTS

| | | |
|---|---|---|
| 88698 | 2/1957 | Nauru ................................. 83/849 |
| 0374103 | 6/1932 | United Kingdom . |
| 2009670 | 6/1979 | United Kingdom . |
| 2113144 | 8/1983 | United Kingdom . |
| 2173735 | 10/1986 | United Kingdom . |

Primary Examiner—Douglas D. Watts
Assistant Examiner—Eugenia A. Jones
Attorney, Agent, or Firm—Wigman & Cohen

[57] ABSTRACT

A reduced resistance saw blade. The saw blade of the present invention has at least two or more groups of sawteeth, the groups of the sawteeth include a first group having a plurality of the sawteeth wherein the tips of the sawteeth are substantially situated on a first imaginary curve which changes in a periodic or irregular cycle, and a second group having a plurality of the sawteeth wherein the tips of the sawteeth are substantially situated on a second imaginary curve parallel to the first imaginary curve. Also provided is a saw blade which includes sets of the sawteeth having reversed set patterns, thus providing a saw blade which is capable of restraining deviation of the cut, maintaining the balance of the lateral sets of the overall saw blade. The saw blade of the present invention includes a plurality of sets of teeth, each set comprising unset, right set and left set teeth, wherein reversed set patterns with the same number of teeth are provided alternately.

10 Claims, 6 Drawing Sheets

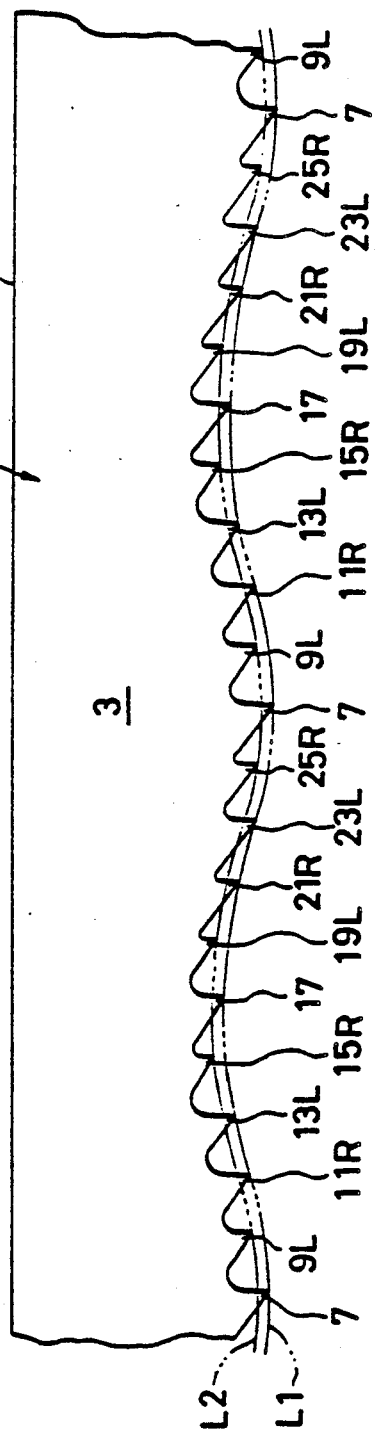

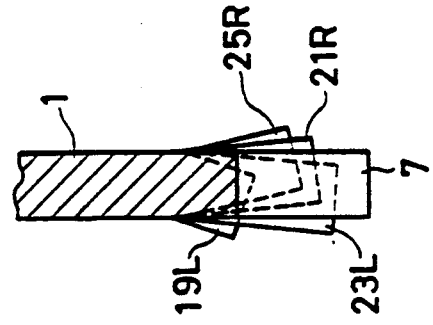
FIG.3
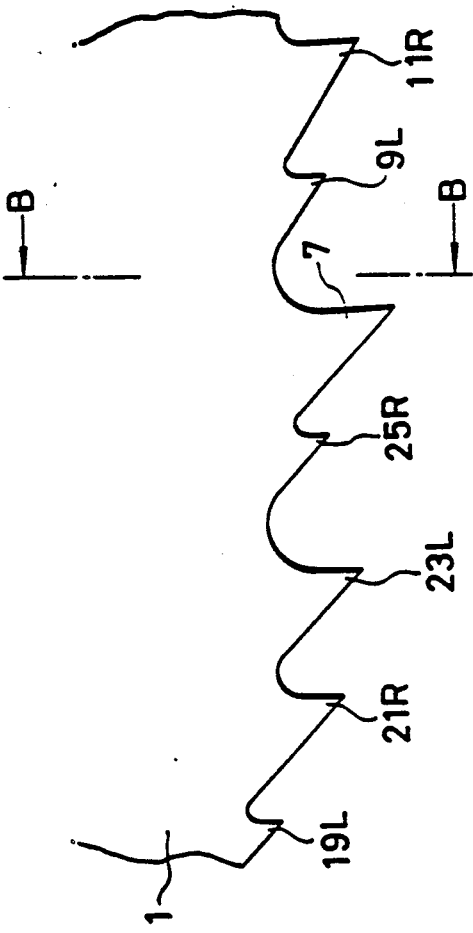
FIG.4(A)
FIG.4(B)

SAW BLADE

BACKGROUND OF THE INVENTION

1. Field of the Invention

The present invention relates to a saw blade used, for example, with a hack saw, circular saw, or band saw, and, in particular, to a saw blade whereby deviation of the cut and noise can be restrained during the cutting of the workpiece.

2. Description of the Prior Art

Conventionally, as one typical example of a saw blade, there is a band saw blade with a uniform band width and with set teeth having a uniform amount of lateral set. In a conventional band saw blade of this type, when cutting a difficult-to-cut material in which work-hardening is easily produced, there are many cases where cutting is extremely difficult.

Accordingly, in order to cope with difficult-to-cut materials and to reduce noise during the cutting various types of saw blades been developed in which the heights of teeth, the amounts of the set of set teeth, or the pitches of the teeth vary from tooth to tooth. Further, as disclosed in U.S. Pat. No. 2239317, a saw blade has been developed in which the band width (from the back of the saw blade to the tips of each tooth) of the band saw blade is periodically changed, i.e. in which an imaginary line joining the tips of many sawteeth is periodically changed.

However, in a conventional band saw blade, the lateral deflection of the blade in the plane of the saw blade can become large as a result of the increase in the cutting resistance when cutting a workpiece, so that a deviation of the cut is easily produced. Also, the saw blade will rub against a work-hardening layer formed on the surface of workpiece during the cutting operation, so that noise is produced.

In addition, in a conventional saw blade, there is the configuration in which an unset tooth and a plurality of left set teeth and right set teeth are combined as one set, and an appropriate number of the sets is alternately positioned. Specifically, in the configuration of this type, in the sets made up of the same number of teeth, the disposed positions of the right set teeth and the left set teeth are generally identical, and in the sets made up of the same number of teeth, the set pattern of the teeth is uniform.

Accordingly, in a manufacturing process and the like, for example, the amount of set in the left and right set teeth in a saw blade may be manufactured to differ from one another; and when the balance of the amount of set in the left and right directions is lost, for example, when the amount of set is greater on one side than on the other, there is a strong tendency for the cut to curve toward one side, so that a deviation of the cut is easily produced.

SUMMARY OF THE INVENTION

A first object of the present invention is to provide, with due consideration to the drawbacks of such conventional saw blades, a saw blade whereby it is possible to cut difficult-to-cut materials, and whereby cutting resistance is reduced, and deviation of the cut and noise can be restrained.

In order to accomplish this object, the saw blade of the present invention comprises at least two or more groups of sawteeth, said groups of the sawteeth include a first group comprising a plurality of the sawteeth wherein the tips of the sawteeth are almost situated on a first imaginary curve which changes in a periodic or irregular cycle, and a second group comprising a plurality of the sawteeth wherein the tips of the sawteeth are almost situated on a second imaginary curve parallel to the first imaginary curve.

A second object of the present invention is to provide a saw blade which comprises sets of the sawteeth having the reversed set patterns, thus providing a saw blade which is capable of restraining deviation of the cut, maintaining the balance of the lateral sets for the overall saw blade.

In order to accomplish this object, the saw blade of the present invention comprises a plurality of sets of teeth, each set comprising unset, right set and left set teeth, wherein reversed set patterns with the same number of teeth are provided alternately.

BRIEF DESCRIPTION OF THE DRAWINGS

These and other objects, features, and advantages of the present invention will become more apparent from the following description of the preferred embodiments taken in conjunction with the accompanying drawings, in which:

FIG. 1 is a front elevation showing part of a saw blade relating to a first embodiment of the present invention.

FIG. 2 is a bottom view of the saw blade of the embodiment of FIG. 1.

FIG. 3 is an explanatory drawing illustrative of the cutting state of the cutting of a workpiece.

FIG. 4(A) is an explanatory drawing showing the main parts of a saw blade.

FIG. 4(B) is a sectional drawing viewed in the direction of the arrows B-B in FIG. 4(A).

DETAILED DESCRIPTION OF THE PREFERRED EMBODIMENTS

Figure 5:
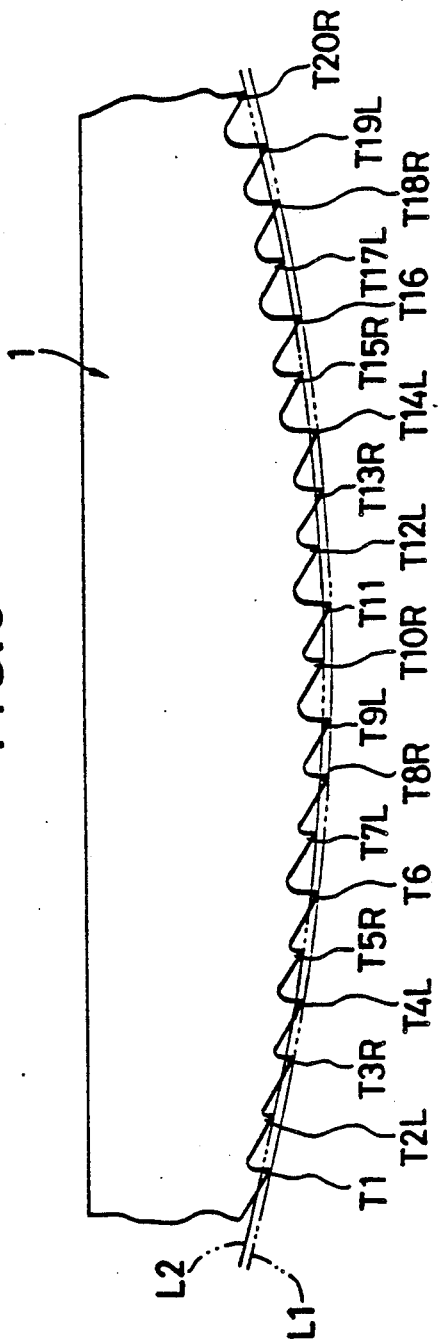
FIG. 5 is a front elevation showing part of a saw blade relating to a second embodiment of the present invention.

Now referring to FIG. 1 and FIG. 2, these figures show a first embodiment of a band saw blade according to the present invention. A plurality of sawteeth are provided on a body section 3 on the opposite side to a rear section 5 of a saw blade 1.

In this embodiment, the saw blade 1 is provided with a first group of sawteeth comprising sawteeth 7, 11R, 13L, 17, 21R, 23L wherein the tips of these teeth are situated on a first imaginary curve L1, which changes in a periodic or irregular cycle, and with a second group of sawteeth comprising sawteeth 9L, 15R, 19L, 25R wherein the tips of these teeth are situated on a second imaginary curve L2, parallel to the first imaginary curve L1. Specifically, the first imaginary curve L1 is obtained as a smooth line joining the tips of the sawteeth 7, 11R, 13L, 17, 21R, 23L, and the second imaginary curve L2 is obtained as a smooth line joining the tips of the sawteeth 9L, 15R, 19L, 25R.

The first imaginary curve L1 is positioned on the outside and the second imaginary curve L2 is positioned on the inside so that the sawteeth 7, 11R, 13L, 17, 21R, 23L form a group of long teeth of which the tips are on the first imaginary curve L1, and the sawteeth 9L, 15R, 19L, 25R form a group of short teeth of which the tips are on the second imaginary curve L2. In this embodiment of the present invention there are two imaginary curves, L1 and L2, but in the case where, for example, an additional group of teeth is provided wherein the teeth are of intermediate height, there could be three imaginary curves. Specifically, in the case where a plurality of sawtooth groups is provided wherein the teeth in each group have the same height but the tooth height differs from group to group, the number of imaginary curves corresponds to the number of groups of different tooth heights.

If desired, teeth may be arranged such that the tips of the teeth are situated on an imaginary kinked line instead of the imaginary curve L1 or L2.

In the saw blade 1, the teeth 7, 17 are unset teeth which are not bent to the lateral directions, which is at right angle to the plane of the saw blade. The sawteeth 11R, 15R, 21R, 25R are right-set teeth which are bent to the right, and the sawteeth 9L, 13L, 19L, 23L are left-set teeth which are bent to the left.

The unset tooth 7 is a long tooth of which the tip is situated on the first imaginary curve L1. As clearly shown in FIG. 1, the unset tooth 7 is positioned close to an apex downwardly projected in the first imaginary curve L1.

In the saw blade 1, the left and right set width of the left and right set sawteeth 9L, 15R, 19L, 25R of which the tips are situated on the second imaginary curve L2 is greater than the left and right set width of the left and right set sawteeth 11R, 13L, 21R, 23L of which the tips are situated on the first imaginary curve L1. Specifically, in the sawtooth groups of different tooth heights, the set width of the groups with short sawteeth is greater than the set width of the groups with long sawteeth.

In addition, in the long teeth group of the left and right set teeth 11R, 13L, 21R, 23L of which the tips are situated on the first imaginary curve L1, the amount of set of the left and right set sawteeth 13L, 21R positioned close to the bottom section of first imaginary curve L1 (the upper section thereof in FIG. 1) is greater than the amount of set of the left and right set sawteeth 23L, 11R positioned close to the apex section of the first imaginary curve L1. Further, in the same way, as for the short teeth, the tips of which are on the second imaginary curve L2, the amount of set of the left and right set sawteeth 19L, 15R positioned close to the bottom section of the curve L2 is greater than the amount of set of the left and right set sawteeth, 9L, 25R positioned close to the apex section thereof.

In the saw blade 1, looking in order at the left and right set sawteeth which precede and follow the unset teeth 7 or 17, for example, the left and right set sawteeth 9L, 25R which precede and follow the unset tooth 7 are set in opposed lateral directions, but the amount of set and tooth height are the same for both teeth. In the same way, the left and right set sawteeth 23L which follows 25R, and the right set sawteeth 11R which precedes 9L are set in opposed lateral directions, but the amount of set and tooth height are the same for both teeth. Furthermore, for the next preceding and following, left and right set sawteeth 13L, 21R, and the next left and right set sawteeth 19L, 15R, the respective direction of set is opposite, but the amount of set and tooth height are the same.

As a result of this saw blade configuration, during the cutting of a workpiece W, when the sawteeth 7, 9L, 11R, 23L. 25R, which are positioned close to the apexes of the first and second imaginary curves L1, L2, are used to cut the workpiece W is large and the amount of the is large, and a deflection in the cutting direction is produced from the resistance to the cutting being carried out by the saw blade 1, so that the back section deflects upward, and the tips of the teeth 7, 9L, 25R, 11R, 23L cut the workpiece W along a track S1, as shown by the solid line in FIG. 3.

At this time, the long sawteeth 7, 11R, 23L, the tips of which are on the first imaginary curve L1, are mainly used for the cutting, and the cut-in load acting on the sawtooth 7 positioned at the apex of the first imaginary curve L1 is large. Accordingly, the sawtooth 7 cuts deeply into the workpiece W, and even if a work-hardened layer is temporarily produced at the cut section of the workpiece W, the tip of the sawtooth 7 cuts in deeply beyond the work-hardened layer, so that the work-hardened layer is broken down and cut.

In addition, when the sawteeth 17, 19L, 15R, 21R, 13L positioned close to the bottom section (the upper section thereof in FIG. 1) of the first and second imaginary curves L1, L2 act on the workpiece W, the load in the cut-in direction of the workpiece W is small, and the deflection of the saw blade 1 is small, so the tips of the sawteeth 17, 19L, 15R, 21R, 13L cut the workpiece W along a track S2 as shown by the dashed line in FIG. 3.

Specifically, because both the tracks S1, S2 are produced during each cycle of the imaginary curves L1, L2 on the saw blade 1, the following sawteeth can cut without rubbing a work-hardened layer on the workpiece W. Accordingly, it is possible to mitigate the cutting resistance as a whole, so that deviation of the cut can be restrained, and noise caused by an increase in cutting resistance can also be reduced.

Also, when the workpiece W is cut by the saw blade 1, the left and right set sawteeth 11R, 13L, 21R, 23L, of the long tooth group, the tips of which are on the first imaginary curve L1, are elastically deformed, angling in the inward direction from the lateral component of the cutting force; however, since the left and right set teeth 9L, 15R, 19L, 25R, of the short tooth group, the tips of which coincide with the second imaginary curve L2, act strongly on the cut surface of the workpiece W, there is a large resistance in the transverse direction to the cut surface, making it difficult to produce a deviation of the cut.

Specifically, as can be understood from FIGS. 4(A) and 4(B), the deviation of the cut in the lateral direction (a direction perpendicular the sheet in FIG. 4(A)) of sawteeth 7, 11R, 23L of the long tooth groups, the tips of which are on the first imaginary curve L1, will make the component force of the adjacent sawteeth 9L, 25R of the short tooth group strongly act in the direction opposed to the deviation, so that the deviation of the cut is restrained. In this case, because the short tooth groups are interspersed among the long tooth groups, the deviation can be effectively restrained.

In addition, because the amount of right and left set of the sawteeth in the respective long tooth and short tooth groups differs according to the height of the teeth, chips produced during the cutting operation are finely divided so that the dischargeability of the chips from between the teeth is improved.

Further, in the long and short tooth groups, the set teeth spaced at the same distance from the rear 5 (for example, teeth 9L and 25R; teeth 11R, and 23L; and the like) are set with the equivalent amount of lateral set, so that the cutting resistance in the lateral directions of the saw blade 1 is equalized and the cutting deviation is restrained.

Figure 6:
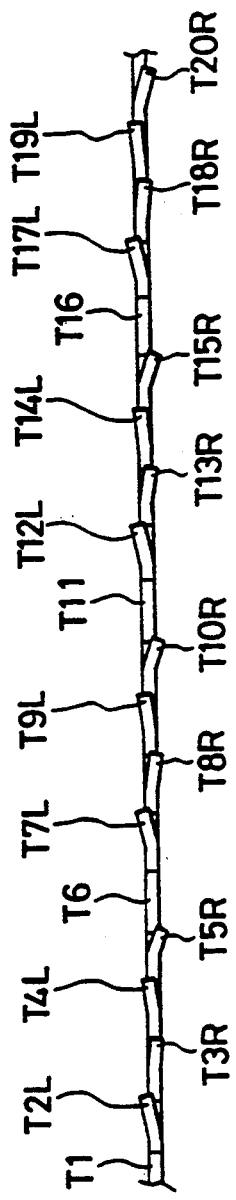
FIG. 6 is a bottom view of the saw blade of the embodiment of FIG. 5.

FIG. 5 and FIG. 6 illustrate a second embodiment of the present invention. In this embodiment, 20 sawteeth, T1 to T20R, are provided within one cycle of the first and second imaginary curves L1, L2. The sawteeth T1, T6, T11, T16 are unset teeth, the tips of which are on the first imaginary curve L1. The sawteeth T3R, T4L, T8R, T9L, T13R, T14L, T18R, T19L, the tips of which are also on the first imaginary curve L1, are respectively right and left set sawteeth. Their set widths are narrower than the set widths of the right and left set sawteeth T2L, T5R, T7L, T10R, T12L, T15R, T17L, T20R, the tips of which are on the second imaginary curve L2.

The saw blade 1 of the second embodiment also provides the same effect as obtained with the saw blade of the first embodiment.

Although, heretofore, the first embodiment of the present invention embodied in the band saw blade is explained, the present invention can also be implemented with other types of saw blades, such as, a circular saw blade and the like. Also, it is possible to increase the number of imaginary curves to more than two. Furthermore, by modifying the number of sawteeth in one cycle of the imaginary curves or a pitch of the cycle, it is possible for the imaginary curve to have an irregular cycle. By such modifications, the increase in noise from the resonance of the saw blade can be more effectively reduced.

To sum up, these embodiments of the present invention provides a group of long sawteeth, the tips of which are on a first imaginary curve, and a group of short sawteeth, the tips of which are on a second imaginary curve, wherein the set width of the group of short sawteeth is larger than the set width of the group of long sawteeth. Accordingly, the sawteeth which act effectively in the cutting direction are the sawteeth in positioned close to the apex of the first imaginary curve in the long tooth group. Because these teeth are few in number, it is possible to make a large cut in the cut direction in this section, making it possible to easily eliminate a work-hardened layer so that difficult-to-cut materials can be cut, and noise and deviation of the cut can be restrained. In addition, the provision of a difference in the set widths makes it possible to produce finely divided chips in the cutting operation. The load on the teeth is also reduced so that the lifespan of the teeth is increased.

Figure 7:
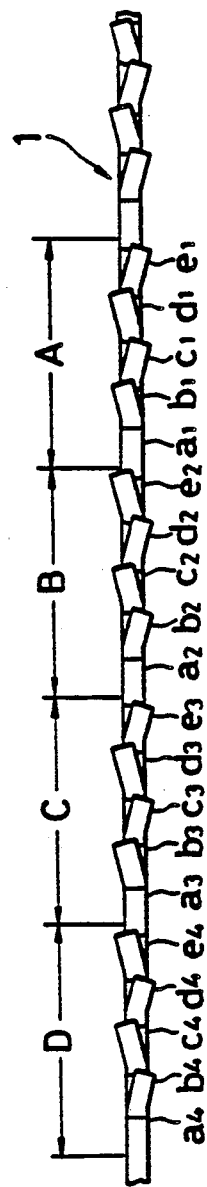
FIG. 7 is a bottom view of a saw blade relating to a third embodiment of the present invention.

Now referring to FIG. 7, the saw blade 1 of a third embodiment of the present invention comprises a first set A made up of a 5-tooth group—an unset tooth $a_1$, two left set teeth $b_1$, $d_1$, and two right set teeth c , el; a second set B made up of a 5-tooth group—an unset tooth $a_2$, two L right set teeth $b_2$, $d_2$, and two left set teeth $c_2$, $e_2$; a third set C of the same configuration as the first set A; and a fourth set D of the same configuration as the second set B:

The first set A has a set pattern wherein the unset tooth $a_1$ is preceded in order by the left set tooth $b_1$, the right set tooth $c_1$, the left set tooth $d_1$, and the right set tooth el The second set B has a set pattern wherein the unset tooth $a_2$ is preceded in order by the right set tooth $b_2$, the left set tooth $c_2$, the right set tooth $d_2$, L and the left set tooth $e_2$. Specifically, the set pattern of the first set A and the set pattern of the second set B are reversed. In the same manner, the set pattern of the third set C and the set pattern of the fourth set D are reversed.

In this embodiment, the number of teeth in each set from the first set A to the fourth set D is the same, and the set pattern of the first set A and the set pattern of the third set C are identical. Therefore, in the configuration of this embodiment, the sets which have the different set patterns are alternately positioned. However, it is also possible to arrange the teeth in a manner such that while maintaining the reverse relation in the set patterns of the third and fourth sets C, D, the number of teeth in the third set C and the fourth set D are suitably increased or decreased so that the number of teeth in the third and fourth sets C, D differs from the number of teeth in the first and second sets A, B. In addition, the positions of the sets A, B, C, D can be suitably varied.

In this connection, it should be noted that the set pattern of the first set A is repeated in a conventional saw blade; thus, if the set pattern of the first set A has a characteristic of cutting in a curve to the left, there is a great tendency to cut in a curve to the left.

However, in the third embodiment of the present invention, the set pattern of the second set B is provided as the reverse of the set pattern of the first set A. Accordingly, the second set B has the characteristic of cutting in a curve to the right, which is the reverse of the first set A. Therefore, the overall saw blade 1 is capable of cutting a material without producing any deviation of the cut.

Figure 8:
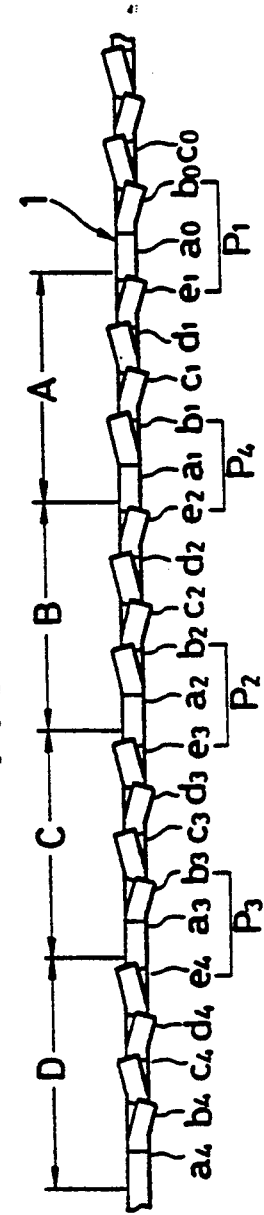
FIG. 8 is a bottom view of a saw blade relating to a fourth embodiment of the present invention.

FIG. 8 shows a fourth embodiment of the present invention. This embodiment comprises a first set A and a second set B with identical set patterns, and a third set C and a fourth set D in which the set patterns are the reverse of the set patterns in the first set A and the second set B. Specifically, in this embodiment, the set pattern of the first set A is the reverse of the set pattern of the third set C, and the set pattern of the second set B is the reverse of the set pattern of the fourth set D. The configuration of this embodiment differs from the configuration shown in FIG. 7 inasmuch as the set patterns are not positioned so that they are alternately reversed.

Furthermore, in the embodiment shown in FIG. 8, when ten teeth of the first set A and the second set B are considered to form one set, and ten teeth of the third set C and the fourth set D are considered to form one set, this can also be looked upon as a configuration wherein the set patterns are positioned so that they are alternately reversed.

In the foregoing configuration the explanation was given for sets A, B, C and D with five teeth each, but it is also acceptable to have three or more teeth including at least a unset tooth, a right set tooth, and a left set tooth. Also, the number of teeth in each set does not necessarily have to be the same, but the number of teeth in the pairs of sets wherein the set patterns are reversed must be the same.

As previously outlined, it is necessary to have three teeth comprising an unset tooth, a right set tooth and a left set tooth in the saw blade. In the case where three teeth form one set, it is preferable that the position patterns of the teeth be made up of the following four patterns. Specifically, as shown in FIG. 8, a first pattern $P_1$ wherein an unset tooth $a_0$ is preceded and followed by the teeth $b_0$, $e_1$, both of which are right set teeth; a second pattern $P_2$ wherein an unset tooth $a_2$ is preceded and followed by the teeth $b_2$, $e_3$, both of which are left set teeth; a third pattern $P_3$ wherein an unset tooth $a_3$ is preceded by a right set tooth $b_3$ and followed by a left set tooth $e_4$ and a fourth pattern $P_4$ wherein an unset tooth al is preceded by a left set tooth $b_1$ and followed by a right set tooth $e_2$. It is preferable that these set patterns $P_1$ to $P_4$ be combined.

In this case, the set patterns of the first pattern $P_1$ and the second pattern $P_2$ are reversed, and the set patterns of the third pattern $P_3$ and the fourth pattern $P_4$ are also reversed. Accordingly, the balance of the left and right sets is maintained for the entire saw blade, a deviation to one side is prevented, and the same effect is obtained as with the previous embodiments.

Specifically, because reversed set patterns are provided alternately in the saw blade of this embodiment, even in the case where one set pattern has the characteristic of, for example, veering to the left, the reverse pattern has the characteristic of veering to the right, making it possible to avoid a tendency toward a deviation of the cut for the saw blade as a whole.

Figure 9:
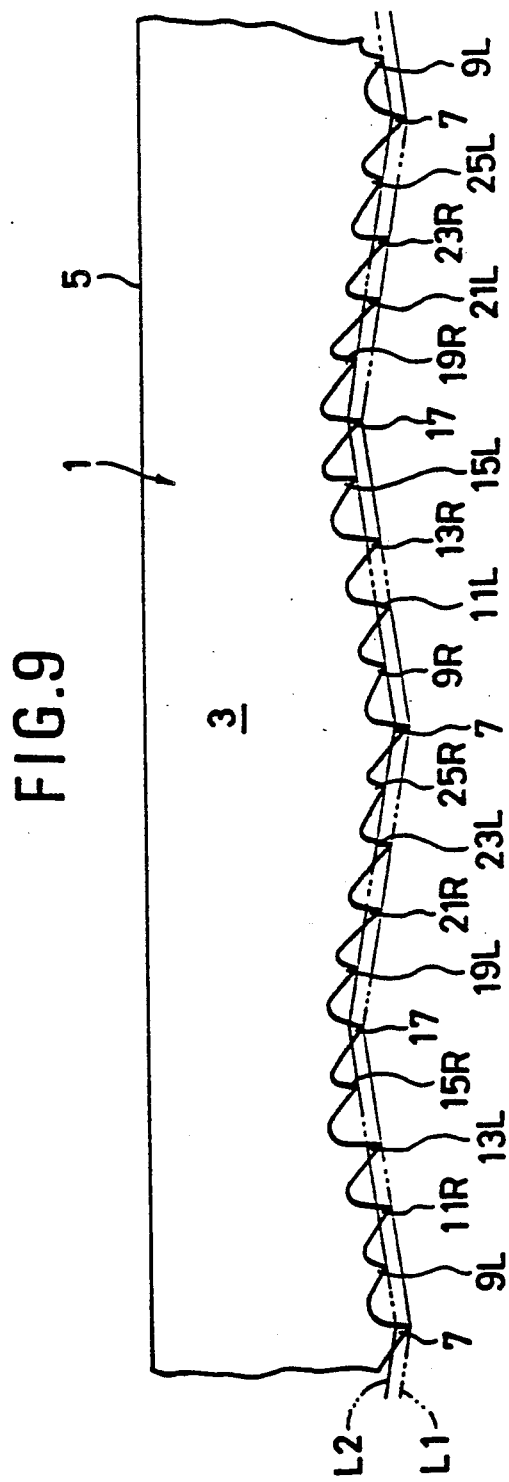
FIG. 9 is a front view of a saw blade relating to a fifth embodiment of the present invention.
Figure 10:
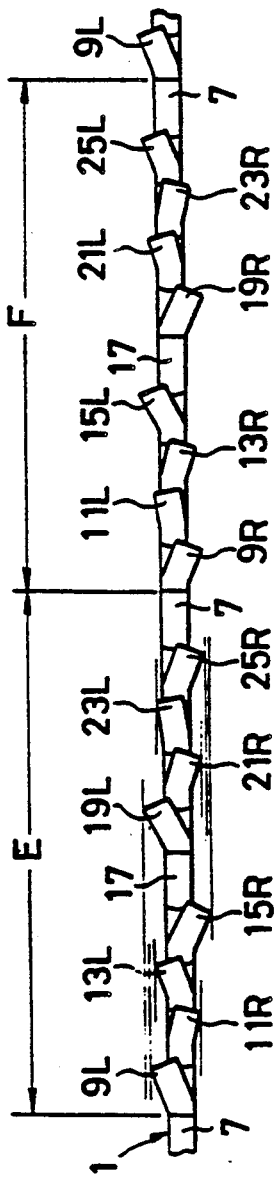
FIG. 10 is a bottom view of the saw blade of the embodiment of FIG. 9.

FIGS. 9 and 10 show a fifth embodiment of the present invention. This embodiment differs from the first embodiment shown in FIGS. 1 and 2 in that there are provided a set pattern E (see FIG. 10) comprising the sawteeth 7, 25R, 23L, 21R, 19L, 17, 15R, 13L, 11R, 9L and a reversed set pattern F comprising the sawteeth 7, 25L, 23R, 21L, 19R, 17, 15L, 13R, 11L, 9R, and the teeth are arranged so that tips thereof are situated on a kinked line L1 or a kinked line L2. Specifically, in this embodiment, the sawteeth 7, 23L, 21R, 17, 13L, 11R of the set pattern E and the sawteeth 7, 23R, 21L, 17, 13R, 11L of the set pattern F are a group of long teeth, the tips of which are on the first imaginary line L1, and the sawteeth 25L, 19L, 15R, 9L, 25L, 19R, 15L, 9R of the set patterns E, F are a group of short teeth, the tips of which are on the second imaginary line L2.

Figure 11:
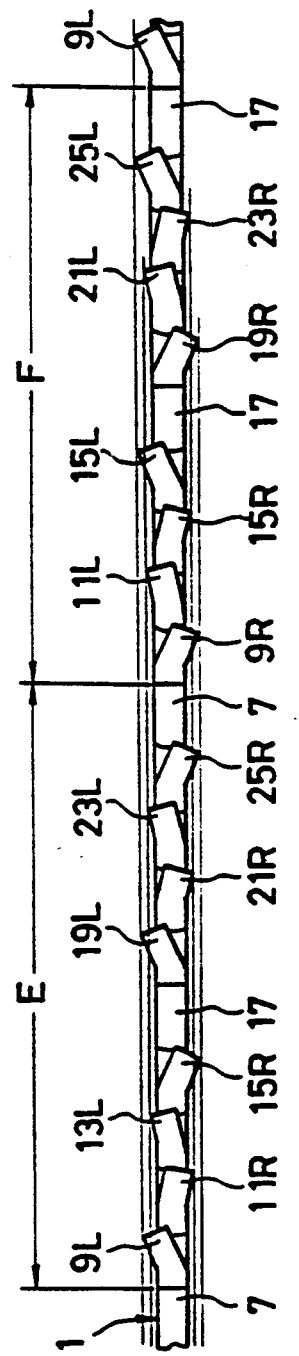
FIG. 11 is a bottom view of a variation of the saw blade shown in FIG. 10.

As shown in FIG. 11, if desired, it is possible to have a tooth configuration wherein amounts of sets of the teeth are the same for all of the long teeth and for all of the short teeth; the same effect is obtained as with the saw blade shown in FIGS. 9 and 10.

To sum up, in the fifth embodiment (FIGS. 9–10), the group of long teeth, the tips of which are on the first imaginary curve, and the group of short teeth, the tips of which are on the second imaginary curve, are provided, forming the set pattern E and the reversed set pattern F alternately, so that difficult-to-cut materials can be cut, and deviation of the cut can be more effectively restrained.

What is claimed is:

1. A saw blade comprising at least two groups of sawteeth, each sawtooth having a tip, said groups of the sawteeth including a first group comprising a plurality of the sawteeth wherein the tips of the sawteeth are situated so as to describe substantially a first imaginary curve which changes in a cycle of varying amplitude, and a second group comprising a plurality of sawteeth wherein the tips of the sawteeth are situated so as to describe substantially a second imaginary curve substantially parallel to the first imaginary curve.

2. The saw blade of claim 1, wherein each sawtooth has a set width, the set width of the sawteeth for which the tips are situated so as to describe substantially the second imaginary curve is greater than the set width of the sawteeth for which the tips are situated so as to describe substantially the first imaginary curve.

3. The saw blade of claim 1, wherein the first group of teeth for which the tips are situated substantially so as to describe the first imaginary curve comprises a plurality of pairs of long sawteeth, each pair of long sawteeth including a left set tooth and a right set tooth having the same amount of set, and the amount of the set of the teeth included in individual pairs of long sawteeth differing from the amount of set of other pairs; and the second group of teeth for which the tips are situated substantially so as to describe the second imaginary curve comprises a plurality of pairs of short sawteeth, each pair of short sawteeth including a left set tooth and a right set tooth having the same amount of set, and the amount of set of the teeth included in different individual pairs of short sawteeth from one another.

4. The saw blade of claim 1, wherein the teeth in the first group of teeth include long unset teeth.

5. A saw blade comprising:
at least two groups of sawteeth, each sawtooth having a tip, said groups of the sawteeth including a first group comprising a plurality of the sawteeth wherein the tips of the sawteeth are situated so as to describe substantially a first imaginary curve which changes in a cycle of varying amplitude, said first imaginary curve having an apex, and a second group comprising a plurality of the sawteeth wherein the tips of the sawteeth are situated so as to describe substantially a second imaginary curve parallel to the first imaginary curve, wherein each group comprises a plurality of sets of teeth, said second imaginary curve having an apex, each set comprising a pattern of a sequence of unset, right set and left set teeth, and wherein further patterns having the same number of teeth reversed in sequence are provided alternately.

6. The saw blade of claim 5, wherein the width of the set sawteeth for which the tips are situated substantially so as to describe the second imaginary curve is greater than the width of the set sawteeth for which the tips are situated substantially so as to describe the first imaginary curve.

7. The saw blade of claim 5 wherein the first group of teeth for which the tips are situated so as to describe substantially the first imaginary curve comprises a plurality of pairs of long sawteeth, each pair of long sawteeth including a left set tooth and a right set tooth having the same amount of set, the amount of set of the teeth included in individual pairs of long sawteeth differing from the amount of set of other pairs; and the second group of teeth for which the tips are situated so as to describe substantially the second imaginary curve comprises a plurality of pairs of short sawteeth, each pair of short sawteeth including a left set tooth and a right set tooth having the same amount of set, and the amount of set of the teeth included in different individual pairs of short sawteeth differing from one another.

8. The saw blade of claim 7, wherein the unset teeth in the group of teeth for which the tips are situated so as to describe substantially the first imaginary curve are long teeth positioned close to the respective apices of the first imaginary curve.

9. The saw blade of claim 8, wherein each of the long unset teeth positioned close to respective apices of the first imaginary curve is interposed between a pair of short set teeth for which the tips are situated so as to describe substantially the second imaginary curve parallel to the first imaginary curve, the long unset tooth and said pair of short set teeth being interposed between a pair of long set teeth for which the tips are situated substantially so as to describe the first imaginary curve.

10. The saw blade of claim 9, wherein the width of each of the short set teeth is greater than the width of each of the long set teeth.

* * * * *